July 29, 1958 T. R. KORCHAK 2,844,910
CONSTRUCTION UNIT
Filed Oct. 3, 1957 2 Sheets-Sheet 1
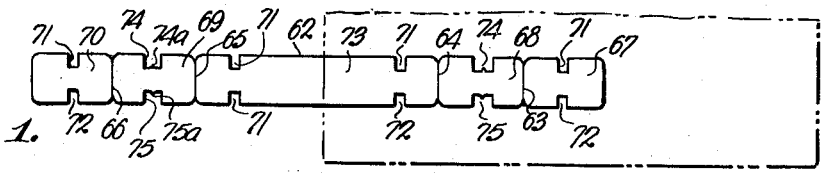
Fig. 1.
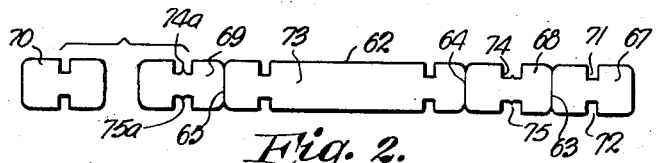
Fig. 2.
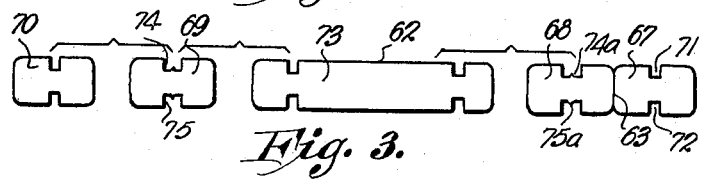
Fig. 3.
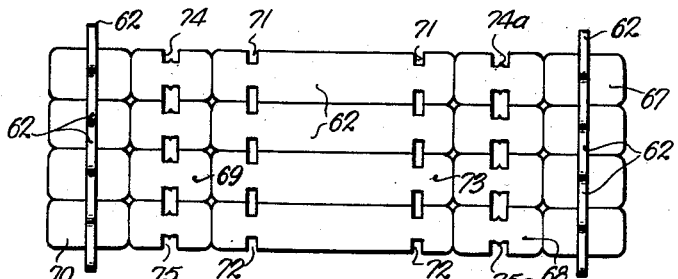
Fig. 4.
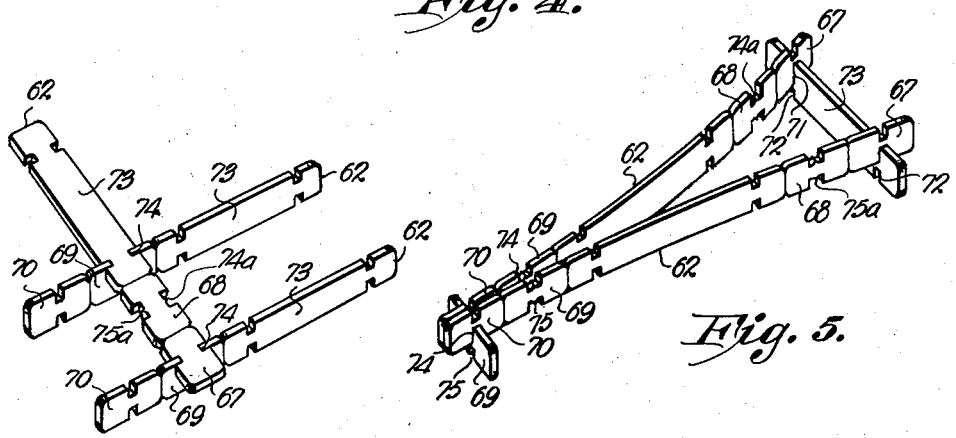
Fig. 5.
Fig. 6.
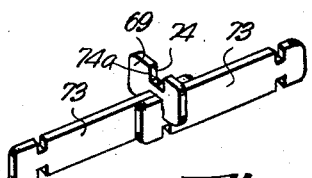
Fig. 7.
INVENTOR.
Thomas R. Korchak
BY
ATTORNEY.

July 29, 1958     T. R. KORCHAK     2,844,910
CONSTRUCTION UNIT

Filed Oct. 3, 1957     2 Sheets-Sheet 2

INVENTOR.
Thomas R. Korchak
BY
ATTORNEY.

United States Patent Office 2,844,910
Patented July 29, 1958

2,844,910

CONSTRUCTION UNIT

Thomas R. Korchak, Kansas City, Kans., assignor to Southern Ice Cream Company, Kansas City, Mo., a corporation of Missouri Application October 3, 1957, Serial No. 688,010

3 Claims. (Cl. 46—28)

This invention relates to construction units for fabricating toy structures and refers more particularly to such a construction unit which is employable as the mounting and handle for a frozen confection.

A large number of frozen confections of all types is presently manufactured and sold under various well known trade names. Such confections include frozen milk, flavored ice, etc. Many of these products are mounted on handles or sticks of various types and forms, the stick material usually wood. Areas of amusement parks, zoos, or any public gathering place where such confections are sold may generally be found littered with such sticks or handles after public gatherings, events or holidays of any sort. Collecting the discarded sticks and disposing of them is a major cleaning problem. It would therefore be of great interest to the vendors of these products to fabricate the handles or sticks mounting the frozen confections in such manner as to give them inherent value to the consumer whereby to cause him to keep them, without actually increasing the cost of the sticks or handles to the vendor.

Toy sets employing building blocks and construction units such as sticks or logs of many types are known in the art. Such game or toy sets often include structural members of numerous forms and shapes which enable the user to construct devices and objects of many and varied types, including vehicles, miniature buildings, and the like. Conventionally, when variety of construction is desired, the construction units are furnished in a variety of forms and sizes with many and varied ways and means of interengaging the various forms and sizes of construction units. It would be eminently desirable to have a single construction unit which itself would be of a strength and form to permit construction use of the single piece or ready fragmentation or separation of the basic construction unit into a plurality or varying plurality of subconstruction units which themselves could be employed in the building process and project. However, since it is often desirable that the basic construction unit itself be flexible for deformation into various shapes for fabricating curved structures and, also, of a certain basic strength, such a construction unit has not previously been provided.

Therefore, an object of the invention is to provide a construction unit for use in miniature play and toy use employable intact as such or readily fragmentable into a plurality of uniform size or variable size construction units each employable in itself to interengage with other such pieces to form various toy or miniature structures.

Another object of the invention is to provide a construction unit for use in miniature, play and toy use which is fragmentable or employable as a single unit yet which is fragmentable or bendable to at least a limited degree to deformable and bendable to at least a limited degree to give a variety of uses as a toy construction unit.

Another object of the invention is to provide a construction unit for use in miniature, play and toy use which is fabricable in a plurality of forms, each form employable itself as a single construction unit or each fragmentable, all of the fragments resulting interengageable to produce large varieties of miniature and toy constructions or structures.

Yet another object of the invention is to provide a construction unit for use in miniature, play and toy applications which is fragmentable or employable alternatively as a single unit, the fragmented portions thereof so formable as to be yet subfragmented if desired to produce still smaller structural units utilizable in the toy construction processes and structures.

Another object of the invention is to provide a construction unit for use in miniature, play and toy use, which construction unit is employable intact as such or fragmented into a plurality of uniform or variable size subconstruction units, the construction unit before fragmentation eminently adaptable for use as a stick mounting for frozen confections or the like.

Still another object of the invention is to provide a confection stick or mounting for carrying frozen confections of ice cream or the like which is employable with others like it, after consumption of the frozen confection, as a construction unit for toy and play purposes.

Another object of the invention is to provide a construction unit for use in miniature, play and toy use employable intact as such or fragmented into a plurality of uniform or variable size construction units, said construction unit before fragmentation yet of such form and strength as to be able to serve as the mounting or reinforcing core for frozen confections.

Yet another object of the invention is to provide a handle, core or mounting for frozen confections which is fragmentable into a plurality of sections, the mounting employable as a unit, or fragmented, as one or more construction units for toy purposes, yet cheap to manufacture, and easy to manufacture in the accuracy required by its function as a toy construction unit.

Still another object of the invention is to provide a frozen confection core of such construction as to give it an inherent use and interest (especially to children) such as to make the cores "collector's items," thereby obviating substantially the problem of the littering and strewing of amusement areas and the like by discarded frozen confection cores.

Still another object of the invention is to provide a frozen confection core which may be fragmented into a plurality of pieces, the core employable as a whole or in the fragmented pieces as toy construction units, the fragmenting of the core itself not requiring an excess application of force nor dangerous to children in the fragmentation thereof, the resultant subfragments safe to handle and use without danger even by small children.

Another object of the invention is to provide a construction unit for use in miniature construction and also as a supporting core for frozen confections or the like wherin the construction unit can be employed in already commonly used automatic or nonautomatic frozn confection stick machines, stick dispensers, stick holders, baggers, etc., to assemble or manufacture the mounted frozen confection.

Yet another object of the invention is to provide a toy construction unit which may be employed as a confection mounting for frozen confections, candy, candied applies or other like comestibles or, indeed, as a disposable mounting for any sort of commodity.

Yet another object of the invention is to provide a construction unit for use in miniature construction and also as a disposable mounting for confections or the like which is eminently employable and adapted for use as a sales tool, a promotional item and, which, as a novelty mounting, will enhance the interest and value of anything with which it is associated as a mounting.

Still another object of the invention is to provide such a construction unit for miniature construction adapted to be used also as a core or mounting for commodities, the core fabricable of varied materials including wood, laminated paper, plastic and the like, any material not harsh or obnoxious in the particular use for which it is employed.

Another object of the invention is to provide a construction unit also useable as a core or mounting for commodities which may be used to fabricate useful, decorative or hobby devices or structures, the unit also having educational potential for children and complex enough in its application to be of interest to adults.

Still another object of the invention is to provide a construction unit for miniature or toy construction adaptable for use as a core or mounting for commodities which may be employed as a unit in construction aptitude tests, occupational therapy and other like functions.

Another object of the invention is to provide a construction unit for use in miniature, play and toy use employable intact as such or fragmented into a plurality of uniform or variable size construction units, said construction unit before fragmentation yet of such form and strength as to be able to serve as the mounting or reinforcing core for frozen confections and further to be so shaped and designed as to provide a greater contact surface with the frozen confection and thereby provide a better tie or union with said confection.

Another object of the invention is to provide a construction unit for use in miniature, play and toy use employable intact as such or fragmented into a plurality of uniform or variable size construction units, said construction unit before fragmentation yet of such form and strength as to be able to serve as the mounting or reinforcing core for frozen confections and further to be so shaped and designed as to provide a handle for said confection that can be more readily gripped and more securely held with decreased chance of dripping or slipping from the holder's hand.

Another object of the invention is to provide a construction unit for use in miniature, play and toy use employable intact as such or fragmented into a plurality of uniform or variable size construction units, said construction unit before fragmentation yet of such form and strength as to be able to serve as the mounting or reinforcing core for frozen confections and further to be so shaped and designed as to act as a deterrent to melted portions of the confection dripping and seeping down the handle onto the holder's hand.

Still another object of the invention is to provide a construction unit for miniature or toy construction adaptable for use as a core or mounting for commodities which may be employed together with and in conjunction with other elements of construction such as roofs, windows, doors, etc., printed on paper cartons, bags, boxes or similar packaging and containers made of plastic or other materials.

Still another object of the invention is to provide a construction unit for miniature or toy construction adaptable for use as a core or mounting for commodities which are available to the consumer at no cost and thereby afford a means of providing free to youth groups (such as Boy Scouts, Cub Scouts, Campfire Girls, etc.) quantities of these units to be used in handicraft.

Still another object of the invention is to provide a construction unit for miniature or toy construction adaptable for use as a core or mounting for commodities which are available to the consumer at no cost and thereby afford a means of providing free to orphanages and various charitable institutions and organizations including relief to foreign children, etc.

Still another object of the invention is to provide a construction unit for miniature or toy construction adaptable for use as a core or mounting for commodities which may be employed together with and in conjunction with devices such as cocktail forks, spoons, table forks and like similar other objects made of wood, plastic, laminated paper and other materials which might be adaptable by special design.

Another object of the invention is to provide a construction unit for use in miniature, play and toy uses which enables a manufacturer to provide a premium or sales device in a product itself wherein the directions and building instructions for use thereof can be placed on the bag or wrapping, if desired, in place of the usual premium offer, thus eliminating the necessity of mailing, premium house hookups, disgruntled consumers who do not always get what they want and, finally, resulting in great savings in goodwill from the consumers and eliminating a headache for dealers and manufacturers.

Other and further objects of the invention will appear in the course of the following description thereof.

In the drawings, which form a part of the instant invention and are to be read in conjunction therewith, embodiments of the invention are shown and, in the various views, like numerals are employed to indicate like parts.

Fig. 1 is a side view of a preferred form of the invention illustrating it as an integral unit.

Fig. 2 is a side view of the construction unit of Fig. 1 with a portion thereof detached.

Fig. 3 is a side view of the construction unit of Fig. 1 with a plurality of portions detached to show some various sized pieces detachable therefrom.

Fig. 4 is a side view of a plurality of the preferred modifications of the invention joined together by like units or subunits fragmented therefrom to form a wall, thus illustrating a typical construction or structure fabricable with the preferred form of the invention.

Fig. 5 is a perspective view of a pair of construction units embodying the preferred form of the invention engaged by two other subunits fragmented from the preferred form of the invention illustrating the strength and integrity of the fragmentable preferred form of the invention under a bending stress.

Fig. 6 is a perspective view of the interengagement of a plurality of subunits fragmented from the preferred form of the construction unit embodying the invention, the subunits so interengaged as to show that various angular dispositions of the pieces relative one another are possible.

Fig. 7 is a perspective view of a pair of fragments of the preferred form of the invention being engaged by a third fragment of the same to show another potential engagement of these parts.

Ice cream, frozen flavored water, and candy sold on sticks, known as ice cream bars, "popsicles" and suckers, respectively, to the trade as well as the public, are well known commodities in the American market and are sold under various trade and generic names. However, the supporting stick in nearly every case is a wooden round member or flat member which in itself is unattractive and of no particular utility. The present invention is to provide a mounting for confections and other commodities, not necessarily edible, which employ a disposable mounting and, as well, furnish a construction unit for miniature construction and toy use or any desired construction use which has a versatility not previously found in such construction units.

The invention may take a number of more or less optional forms but may be generally characterized as an elongate body member or element having a plurality of like body element engaging means spaced along the length thereof with at least one weakened line of severance also formed in the body element to permit detachment of at least one portion of the body element from the remainder thereof containing at least one like body element engaging means, the remaining portion of the body element after detachment also having at least one of said body element engaging means therein. Figs. 1–4 illustrate the preferred modification of the invention, Figs. 5–7 show various engagements of typical forms of the invention and Figs. 8–13 show other forms of the invention.

The order of description will proceed in inverse order from Fig. 12 through Fig. 8 to illustrate the typical subsidiary forms of the invention, then the preferred modification of Figs. 1–4 will be described and its typical uses and then the modification of Figs. 13–15.

Figure 12:
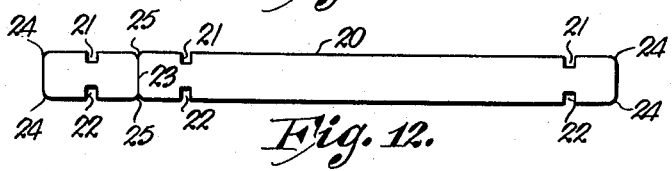
Fig. 12 illustrates in side view a sixth modification of the inventive construction unit showing a body element made up of a piece having a single set of notches and a piece having a pair of notches, each piece optionally fragmentable one from the other.

Referring then to Fig. 12, the numeral 20 generally designates the body element of the construction unit and/or mounting stick for a commodity. The length of the body element 20 is greater than its width and thickness, the width preferably being at least slightly greater than the thickness. The body element 20 may be made of wood, laminated paper, plastic, molded wood or any other material not antagonistic to the use for which the body element is to be put. Thus, if it is to be a mounting for an edible commodity or a frozen confection, the material should not be such as to adversely affect the flavor or composition of the foodstuff. Likewise, the material should not be harsh to the hands of the user should it be employed merely as a construction unit in miniature construction. If it is desired to employ the construction unit in the well known standard sized forming machines for frozen confections, the dimensions of the stick as to length, width and thickness are necessarily predetermined. In confection mounting sticks now employed in such machines the thickness thereof is substantially equal to one-quarter of the width. The preferable dimensions of the inventive mounting are a thickness precisely one-fourth the width. The above machines will handle this dimension of stick. With these dimensions determined, the dimensions of the other inventive body element engaging means, particularly if they are to be notches as shown in Fig. 12, are also determined.

A plurality of notches 21 at least equal in width (and preferably slightly greater) to the thickness of the body element and in depth preferably equal to one-quarter of the width of the body element are formed in one longitudinal edge of the body element. A plurality of like notches 22 are formed in the opposite longitudinal edge preferably spaced opposite the notches 21. A weakened line of severance 23, comprising a groove, a crimp, a furrow, a striation or corrugation or indentation of any suitable type, is formed across the body element preferably normal to the longitudinal axis thereof. The weakened line of severance preferably is formed into both sides of the body element 20 in symmetrical fashion but may be formed into only one side. The free ends of the body element are preferably but not necessarily rounded off as at 24 at both ends thereof and, if such is the case, the end edges of the weakened line of severance 23 are inwardly cut to a certain extent as shown at 25. The purpose of this inward forming or cutting is to aid in the severance and, also, make uniform the appearance of the ends of the severed portions after severance. The weakened line of severance need not be continuous across the body element so long as it permits a fairly even, controllable break.

In the modification of the invention of Fig. 12, it is desired that the body element 20 be severable into two pieces, one having a single notch therein and the other having a pair of notches therein, the notches in the latter disposed adjacent the ends thereof when the former subunit is severed or broken away therefrom. It also should be noted that the strength of the body element 20 at the weakened line of severance 23 must not be reduced to the level where (1) the body element will not be able to carry any commodity desired to be affixed thereto subject to normal stresses or serve as a stable satisfactory handle therefor for the period desired or (2) the body element 20 will fracture or separate along the line of severance 23 before any sizable application of force or bending moment is applied thereto. A properly formed weakened line of severance is one where application of bending force on each side of the line of severance 23 will cause separation only at the line of severance and not in the material therearound, but yet will require a definite segregation of forces applied in that area to cause such fragmentation or separation. The character of the weakened line of severance will necessarily depend somewhat on the character of the material employed to form the body element 20.

Figure 11:
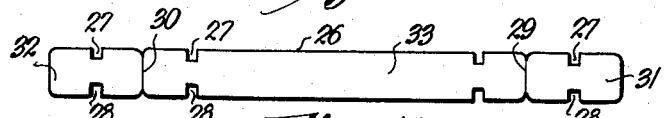
Fig. 11 is a side view of a fifth modification of the inventive construction unit showing a body element containing a pair of pieces each having a single set of notches and a single piece having a pair of notches, each piece optionally fragmentable from the whole or one another.

Referring now to the modification shown in Fig. 11, therein is shown a body element generally designated at 26 preferably of the same dimensions as the modification of Fig. 12 having a plurality of notches 27 formed in one longitudinal edge thereof opposed by a like opposed plurality of notches 28 in the other longitudinal edge. In the instant construction, four sets of notches are employed. Weakened lines of severance 29 and 30 are formed in the same manner as previously described relative Fig. 12 between different pairs of sets of notches 27 and 28. In the Fig. 11 modification, the sets of notches 27 and 28 and weakened lines of severance 29 and 30 are so spaced relative the body element 26 as to permit the optional fragmentation off or splitting off of either one or two singly notched pieces (designated as 31 and 32) from a doubly notched larger piece designated at 33. The ends of element 26 and edges thereof adjacent the lines of severance are rounded off and inwardly cut in the manner previously described relative the Fig. 12 modification to permit the formation of separate pieces each of the same general end configuration. The character, position and dimensions of the lines of severance 29 and 30 and notches 27 and 28 are preferably the same as those previously described relative Fig. 12.

Figure 10:
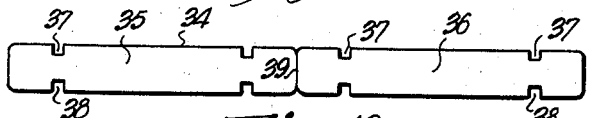
Fig. 10 illustrates in side view a fourth modification of the inventive construction unit showing a body element containing a pair of pieces each having two sets of notches, the pieces optionally fragmentable one from the other.

Referring now to the construction shown in Fig. 10, therein is illustrated a body element generally designated at 34 adapted to be fragmented or split into two fragments designated at 35 and 36, respectively, each fragment or subunit having pairs of notches 37 and 38 spaced along opposite longitudinal edges thereof. A single weakened line of severance 39 extends preferably normal to the longitudinal axis of the body element 34 and is preferably centered relative thereto. The dimensions of the body element 34 and the notches 37 and 38, the character of the weakened line of severance 39, the optional rounding of the ends of the body element 34 and the inward forming of the edges relative the line of severance 39 are preferably as previously described relative the previous modification. Likewise, the character of the materials employed in the body element and the stresses which the line of severance must stand are preferably substantially as in the previously described modification. The showing of the Fig. 10 modification illustrates a two-piece body element productive of two symmetrical relatively large construction units upon fragmentation thereof.

Figure 9:
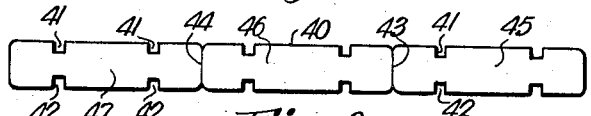
Fig. 9 is a side view of a third modification of the inventive construction unit showing a body element made up of a plurality of pieces each having two sets of notches, the pieces optionally fragmentable one from the other.

Referring now to Fig. 9, therein is shown a body element generally designated at 40 containing six sets of notches 41 and 42 and two weakened lines of severance 43 and 44, whereby to be fragmentable into three symmetrical members 45, 46 and 47 or a pair of symmetrical members made up of two of the members (either 45 and 46 or 46 and 47) and the third member, each having a pair of symmetrically disposed notches in the longitudinal edges thereof. The character of the material making up the body element 40, its dimensions, the dimensions of the notches 41 and 42, the character of the lines of severance 43 and 44, the rounding of the ends of the segments 45 and 47 as well as the inward cutting of the longitudinal edges adjacent the lines of severance, etc., are preferably as previously described relative the modification of Fig. 12. The Fig. 9 modification is similar to that of Fig. 11 in possessing two weakened lines of severance but differs in the symmetrical construction of each piece and the paired notches in each fragmentable piece.

Figure 8:
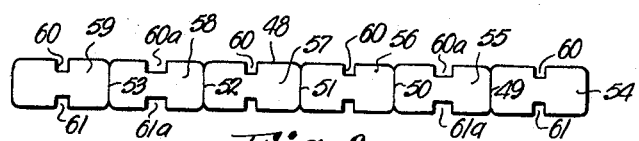
Fig. 8 illustrates in side view a second modification of the inventive construction unit showing a body element made up of a plurality of units each having a single set of notches, the units optionally fragmentable one from the other.

Referring now to Fig. 8, the numeral 48 generally designates a body element which is preferably of the same general dimensions, materials, etc., as the modifications previously described but differs from them in having (1) a plurality of lines of severance 49, 50, 51, 52 and 53 defining detachable elements or subunits 54—59, inclusive, each having only one set of notches 60 and 61 or 60a and 61a therein. Notches 60 and 61 are preferably of the same character and dimension as those previously described relative Fig. 12. However, notches 60a and 61a are "double" notches in that the width thereof is preferably exactly twice that of the notches 60 and 61. This type of notch permits constructions as are seen in Figs. 5 and 6 where, in the latter, double notches receive the width of the body elements between single or double notches therein and where, in the former, a pair of body elements may be received side by side therein. The rounding of the ends of body element 48, the inward forming of the body element edges relative the lines of severance, the dimensions of the body element as to length, width and thickness, etc., are preferably the same as previously described relative Fig. 12. The Fig. 8 construction may serve as either a single, one-piece construction unit which permits engagement with any part thereof or as a source of subunits of varying length, as desired. Thus, subunits of 1, 2, 3, 4 and 5 segments may be provided.

Referring now to Fig. 1, therein is shown a preferred modification of the inventive construction stick (hereinafter called "universal") and commodity mounting, the integral body element thereof being generally designated at 62. Body element 62 is preferably of the same construction in its total dimensions and material as the Fig. 12 modification. However, it differs therefrom in that four weakened lines of severance 63, 64, 65 and 66, also of the character previously described, may be employed, if desired, to fragment the body element into two or more subpieces 67, 68, 69, 70 and 73. One set of single width notches is formed in each piece 67 and 70 and one set is positioned adjacent each weakened line of severance 64 and 65 in central piece 73. Sets of double notches 74 and 75 are formed in pieces 68 and 69. Pips 74a and 75a may be provided to make the double notches operable as singles.

Figs. 2 and 3 show two of the several possible subunits of the basic body element 62. In Fig. 2, the single end piece 70 is shown split off leaving the remainder of the unit as an entity. In Fig. 3, two single pieces 69 and 70 are separated from the body element and from one another, while pieces 67 and 68 are separated from piece 73, but not from one another. While other combinations can be made, Figs. 2 and 3 illustrate the versatility of the preferred modification of the invention. The factor of versatility is of prime interest in any single construction unit which is to be mass produced for use as a commodity mounting for a product of the nature of a frozen confection. A manufacturer may in some situations want to vary the individual constructions of the commodity mountings and produce a family of types of mountings as shown in Figs. 8–12, inclusive. However, on the other hand, he may desire to produce but a single construction piece which, nevertheless, retains the ability to subfragment into such a variety of pieces that it can be used to construct substantially the entire variety of constructions fabricable from a large family of mounting types or the manufacturer may prefer to produce a combination of various pieces including the "universal." The preferred modification of Figs. 1–3 is of this latter type in that it is fragmentable into a relatively large number of combinations of pieces of varying length, it contains pieces having both double and single notches and it contains basic single pieces of varying length. The rounding of the ends of the body element 62 and the forming of the edges thereof relative the weakened lines of severance are preferably as previously described relative the other modifications of the invention. Likewise, the character of the weakened lines of severance is preferably the same. A confection is schematically indicated at 62a in Fig. 1.

Fig. 4 shows a plurality of "universal" type body elements 62 engaged by a plurality of other body elements 62 in the notches 71 and 72 of the end pieces 67 and 70 at right angles to the longitudinal axes of the former. In this manner a wall construction of indefinite height can be assembled. It may also be noted that the remaining internal notches 71 and 72 as well as 74 and 75 are available for internal cross bracing in an assembled structure, if desired. This is another of the versatility features of the body element 62.

Fig. 6 shows the engagement of three like subunits of the body elements 62 of the preferred modification of the invention. The fragment 62 engaging the double notches 74 of the subpieces 69 is composed of subunits 67, 68 and 73, while the engaged pieces are made up of the pieces 73, 69 and 70.

Fig. 5 shows a pair of body elements 62 of the preferred form of the invention engaged at one end by a separate subunit 69 having "double" notches 74 and 75 therein and, at the other end, by subunit 73 engaging single notches 72 in subunits 67. This showing illustrates the fact that the basic element 62 should be of sufficient strength despite the weakened lines of severance to permit deforming thereof in a curved fashion. Such deformation can be employed in the construction of ship models or when sufficient multiples of sticks are used they are capable of forming a complete circle, and the like.

Fig. 7 shows the engagement of a pair of subpieces equivalent to subunit 73 of body element 62 by a subunit equivalent to subpieces 69 of the same body element, the double notch in the piece 69 permitting such plural engagement.

Figure 13:
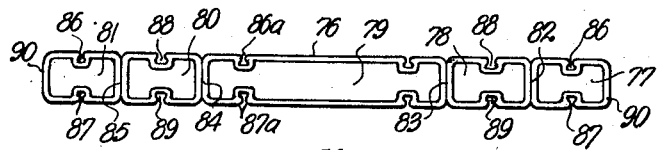
Fig. 13 shows in side view a seventh modification of the inventive construction unit wherein the periphery of the construction unit is of a greater thickness than the remainder thereof and the notches have each engaging nibs at their peripheral ends, the unit otherwise identical in construction with the preferred modification of Fig. 1.
Figure 14:
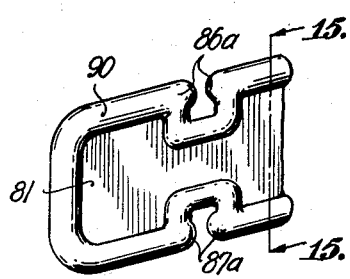
Fig. 14 is a perspective view of a portion of the end of the modification shown in Fig. 13.
Figure 15:
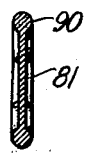
Fig. 15 is a view taken along the lines 15—15 in the direction of the arrows.

Referring now to Figs. 13–15, therein is shown a body element 76 of the same general configuration or outline of body element 62 of the modification of Figs. 1–3, yet with the periphery of the body element formed of a greater thickness and the notches therein having formed portions to increase the grasping force thereof. Body element 76 thus is made up of potential subunits 77, 78, 79, 80 and 81, potentially divided one from the other by weakened lines of severance 82, 83, 84 and 85. Sets of single width notches 86 and 87 are formed in pieces 77 and 81 and adjacent the ends of piece 79. Sets of double width notches 88 and 89 are formed in pieces 78 and 80. The periphery 90 of the element 76 and each subelement is formed of a greater thickness than the remainder of the body element 76 and this refers also to the area of the body element 76 peripheral to notches 86-89. Such construction is best seen in Figs. 14 and 15. The portion 90 of greater thickness is centrally positioned relative the remaining body portion of lesser thickness, as may be seen in Fig. 15. While wooden construction units of this form may be fabricated, they are easiest and best molded from plastic or like substances. In Fig. 14, nibs 86a and 87a may clearly be seen whereby the notches may exert a greater engaging force on a like body element 76 or a body element of the type shown in the other figures. Preferably, each notch 86 and 87 as well as 88 and 89 have such inwardly formed nibs to permit such engagement. Other than the greater thickness portion 90 and the nibs, the dimensions and other characteristics of the body element 76 and its parts are preferably like those previously described relative the other modifications.

The operation of the various modifications of the invention have been described relative the description of the specific modifications and it remains merely to point out that the subunits in all modifications may be separated from the other subunits of the body elements 20, 26, 34, 40, 48, 62 and 76 merely by exerting sufficient force or pressure in the same direction on each side of a weakened line of severance with appropriate counterpressure on the opposite side of the stick thereby fragmenting the stick along the stressed line of severance.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A stick construction unit comprising a three dimensional elongate body element having a length greater than its width and thickness, said body element also of substantially rectangular shape whereby to have at least substantially parallel longitudinal edges and at least substantially like, opposed, end edges, a weakened line of severance extending across the width of the body element at least substantially at right angles to its longitudinal axis whereby to define at least two segments of the body element, the longitudinal edges of the body element, where contacted by the weakened line of severance, inwardly formed in at least substantially V-shaped indentations, at least one notch in each longitudinal edge of each of said segments adapted to interlock one of said segments with at least another similar segment having at least one notch therein of like character, each said notch of a width at least equal to the thickness of the body element, the free ends of the body element before severance of the segments thereof from one another so formed as to at least substantially match the form of the previously connected ends of the segments after severance.

2. A stick construction unit as in claim 1 wherein at least two notches in one of said segments are of a width at least equal to twice the thickness of the body element.

3. A stick construction unit as in claim 1 wherein at least two notches in each segment are opposed and the distance between the bottom walls of said opposed notches is slightly less than twice the thickness of the body element.

References Cited in the file of this patent

UNITED STATES PATENTS

| | | |
|---|---|---|
| 1,586,137 | Zanath | May 25, 1926 |
| 1,929,906 | Skokowski | Oct. 10, 1933 |
| 1,936,816 | Zitzman | Nov. 28, 1933 |
| 1,984,799 | Jacobson | Dec. 18, 1934 |
| 2,104,742 | Fleischer | Jan. 11, 1938 |
| 2,110,990 | Forbes | Mar. 15, 1938 |
| 2,233,640 | Pizzarelli | Mar. 4, 1941 |
| 2,469,589 | Barricini | May 10, 1949 |